US012634805B2

(12) United States Patent
    Imai et al.

(10) Patent No.:    US 12,634,805 B2
(45) Date of Patent:         May 19, 2026

(54) COMMUNICATION DEVICE, BASE STATION, CONTROL METHOD, AND COMPUTER-READABLE STORAGE MEDIUM FOR SELECTING A SECOND DEVICE FOR RELAYING COMMUNICATION BETWEEN DEVICES

(71) Applicant: HONDA MOTOR CO., LTD., Tokyo (JP)

(72) Inventors: Naoko Imai, Tokyo (JP); Yusuke Oi, Tokyo (JP); Masahiro Takahata, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 18/234,125

(22) Filed: Aug. 15, 2023

(65)         Prior Publication Data

US 2023/0388901 A1      Nov. 30, 2023

Related U.S. Application Data

(63) Continuation of application No. PCT/JP2021/006980, filed on Feb. 25, 2021.

(51) Int. Cl.
    *H04W 48/10*        (2009.01)
    *H04W 76/10*        (2018.01)
(52) U.S. Cl.
    CPC .......... *H04W 48/10* (2013.01); *H04W 76/10* (2018.02)

(58) Field of Classification Search
    CPC ..... H04W 48/10; H04W 48/18; H04W 76/10; H04W 88/04
    See application file for complete search history.

(56)         References Cited

U.S. PATENT DOCUMENTS 5,249,304 A * 9/1993 Mulford ................ H04W 84/08
                                                       455/512
5,371,780 A * 12/1994 Amitay ................ H04W 74/08
                                                       370/335
                (Continued)

FOREIGN PATENT DOCUMENTS

EP          2983408 A1      2/2016
EP          3554137 A1      10/2019
                (Continued)

OTHER PUBLICATIONS

U.S. Appl. No. 63/083,845 Drawings (Year: 2020).*
                (Continued)

*Primary Examiner* — Dung B Huynh
(74) *Attorney, Agent, or Firm* — THOMAS | HORSTEMEYER, LLP

(57)         ABSTRACT

A communication device that performs communication wirelessly receives by using a first communication method, from a first another device, information regarding a condition for communication in a second communication method within a geographical range where communication with the first another device is possible, the second communication method being different from the first communication method, and selects a second another device that performs the communication in the second communication method, based on the information regarding the condition.

13 Claims, 3 Drawing Sheets

(56) References Cited

U.S. PATENT DOCUMENTS

| | | | |
|---|---|---|---|
| 6,526,034 B1 | 2/2003 | Gorsuch | |
| 7,013,162 B2 | 3/2006 | Gorsuch | |
| 7,266,683 B1* | 9/2007 | Nag | H04L 63/0428 |
| | | | 713/150 |
| 7,616,970 B2 | 11/2009 | Gorsuch | |
| 8,380,244 B2 | 2/2013 | Gorsuch | |
| 8,548,478 B2 | 10/2013 | Ozluturk | |
| 8,754,788 B2 | 6/2014 | Yamamoto | |
| 8,792,439 B2 | 7/2014 | Kahn et al. | |
| 8,879,489 B2* | 11/2014 | Lee | H04W 72/12 |
| | | | 370/329 |
| 9,408,253 B2 | 8/2016 | Gorsuch | |
| 9,420,632 B2 | 8/2016 | Gorsuch | |
| 9,451,654 B2 | 9/2016 | Jafarian et al. | |
| 9,572,087 B2 | 2/2017 | Nagasaka et al. | |
| 9,674,778 B2 | 6/2017 | Nagasaka et al. | |
| 9,814,087 B2 | 11/2017 | Yanagi et al. | |
| 10,045,271 B2 | 8/2018 | Ozluturk | |
| 10,097,964 B2 | 10/2018 | Zhang et al. | |
| 10,129,412 B1* | 11/2018 | Singh | B32B 17/10761 |
| 10,171,967 B2 | 1/2019 | Ameixieira | |
| 10,171,986 B2 | 1/2019 | Tsuchie | |
| 10,172,079 B2 | 1/2019 | Nagasaka et al. | |
| 10,194,360 B2 | 1/2019 | Sirotkin et al. | |
| 10,194,361 B2 | 1/2019 | Sirotkin et al. | |
| 10,356,640 B2 | 7/2019 | Sirotkin et al. | |
| 10,375,618 B2 | 8/2019 | Onishi et al. | |
| 10,440,452 B2 | 10/2019 | Mach et al. | |
| 10,530,461 B2 | 1/2020 | Sadiq et al. | |
| 10,542,478 B2 | 1/2020 | Tsuchie | |
| 10,565,874 B1 | 2/2020 | Lei et al. | |
| 10,575,149 B2 | 2/2020 | Wu et al. | |
| 10,588,112 B2 | 3/2020 | Lee et al. | |
| 10,605,927 B2 | 3/2020 | Marmet et al. | |
| 10,623,919 B2 | 4/2020 | Yamada et al. | |
| 10,708,812 B2 | 7/2020 | Basu Mallick et al. | |
| 10,743,159 B2 | 8/2020 | Ameixieira | |
| 10,826,769 B2 | 11/2020 | Deng et al. | |
| 10,841,762 B2 | 11/2020 | Henry et al. | |
| 10,924,912 B2 | 2/2021 | Kim et al. | |
| 10,966,226 B2 | 3/2021 | Feng et al. | |
| 10,967,880 B2 | 4/2021 | Rodriguez Bravo et al. | |
| 11,064,323 B2 | 7/2021 | Esselink et al. | |
| 11,172,327 B2 | 11/2021 | Nguyen et al. | |
| 11,197,180 B2 | 12/2021 | Uchiyama et al. | |
| 11,310,717 B2 | 4/2022 | Lin et al. | |
| 11,350,445 B2 | 5/2022 | Fujishiro et al. | |
| 11,438,736 B2 | 9/2022 | Fehrenbach et al. | |
| 11,452,032 B2 | 9/2022 | Gupta et al. | |
| 11,472,405 B2 | 10/2022 | Vassilovski et al. | |
| 11,595,977 B2 | 2/2023 | Feng et al. | |
| 11,653,292 B2 | 5/2023 | Azizi et al. | |
| 11,665,730 B2 | 5/2023 | Ahmad | |
| 11,716,754 B2 | 8/2023 | Fujishiro et al. | |
| 11,760,369 B2 | 9/2023 | Rodriguez Bravo et al. | |
| 11,778,416 B2 | 10/2023 | Nguyen et al. | |
| 11,800,439 B2 | 10/2023 | Azizi et al. | |
| 11,832,225 B2* | 11/2023 | Kimba Dit Adamou | |
| | | | H04W 72/0446 |
| 11,838,151 B1* | 12/2023 | Jones | H04L 25/0224 |
| 12,047,931 B2* | 7/2024 | Wang | H04W 72/20 |
| 12,074,829 B2 | 8/2024 | Ibrahim et al. | |
| 12,127,145 B2 | 10/2024 | Li et al. | |
| 12,267,715 B2* | 4/2025 | Wang | H04W 24/08 |
| 2002/0177445 A1* | 11/2002 | Hans | H04W 72/04 |
| | | | 455/450 |
| 2003/0093491 A1* | 5/2003 | Valjakka | H04L 67/1029 |
| | | | 709/241 |
| 2004/0018854 A1 | 1/2004 | Gorsuch | |
| 2004/0039504 A1* | 2/2004 | Coffee | B60P 3/03 |
| | | | 701/482 |
| 2004/0076222 A1* | 4/2004 | De Francesco | H04L 47/263 |
| | | | 375/141 |

| | | | |
|---|---|---|---|
| 2004/0172464 A1* | 9/2004 | Nag | H04L 65/80 |
| | | | 709/223 |
| 2005/0107085 A1 | 5/2005 | Ozluturk | |
| 2006/0075119 A1 | 4/2006 | Hussain et al. | |
| 2006/0116129 A1 | 6/2006 | Gorsuch | |
| 2006/0245398 A1* | 11/2006 | Li | H04B 7/2668 |
| | | | 370/335 |
| 2008/0013489 A1* | 1/2008 | Anigstein | H04W 36/06 |
| | | | 370/331 |
| 2008/0125136 A1* | 5/2008 | Song | H04L 1/0026 |
| | | | 370/336 |
| 2008/0165795 A1 | 7/2008 | Baruch | |
| 2009/0034447 A1* | 2/2009 | Yu | H04B 7/15542 |
| | | | 370/315 |
| 2009/0164581 A1* | 6/2009 | Bove | G06F 16/954 |
| | | | 709/205 |
| 2010/0067417 A1* | 3/2010 | Zhou | H04W 56/005 |
| | | | 370/336 |
| 2010/0150157 A1* | 6/2010 | Wang | H04L 67/1034 |
| | | | 370/392 |
| 2010/0202425 A1 | 8/2010 | Gorsuch | |
| 2010/0246531 A1* | 9/2010 | Chang | H04W 52/367 |
| | | | 370/329 |
| 2011/0012756 A1 | 1/2011 | Yamamoto | |
| 2011/0064164 A1* | 3/2011 | Seo | H04L 1/1861 |
| | | | 455/313 |
| 2011/0274026 A1* | 11/2011 | Huang | H04J 11/0069 |
| | | | 370/312 |
| 2011/0310748 A1 | 12/2011 | Mizugaki et al. | |
| 2012/0020250 A1 | 1/2012 | Sundararaman et al. | |
| 2012/0207080 A1* | 8/2012 | Chang | H04W 56/005 |
| | | | 370/350 |
| 2012/0208582 A1* | 8/2012 | Kang | H04W 16/14 |
| | | | 455/509 |
| 2013/0086164 A1 | 4/2013 | Wheeler et al. | |
| 2013/0089033 A1 | 4/2013 | Kahn et al. | |
| 2013/0137364 A1* | 5/2013 | Redana | H04B 7/15 |
| | | | 455/9 |
| 2013/0143551 A1 | 6/2013 | Gorsuch | |
| 2013/0301615 A1 | 11/2013 | Ozluturk | |
| 2014/0056210 A1 | 2/2014 | Jafarian et al. | |
| 2014/0079022 A1 | 3/2014 | Wang et al. | |
| 2014/0086219 A1 | 3/2014 | Suzuki et al. | |
| 2014/0161103 A1 | 6/2014 | Sirotkin et al. | |
| 2015/0081776 A1* | 3/2015 | Selvaraj | H04L 65/1104 |
| | | | 709/203 |
| 2015/0098382 A1* | 4/2015 | Duval | H04W 76/14 |
| | | | 370/312 |
| 2015/0133187 A1 | 5/2015 | Gorsuch | |
| 2016/0007152 A1* | 1/2016 | Johnsson | H04L 67/56 |
| | | | 370/329 |
| 2016/0029295 A1 | 1/2016 | Nagasaka et al. | |
| 2016/0157182 A1* | 6/2016 | Izawa | H04W 52/383 |
| | | | 455/522 |
| 2016/0183167 A1* | 6/2016 | Agiwal | H04W 48/08 |
| | | | 370/329 |
| 2016/0212787 A1 | 7/2016 | Yanagi et al. | |
| 2016/0227380 A1 | 8/2016 | Zhang et al. | |
| 2016/0227463 A1* | 8/2016 | Baligh | H04W 40/02 |
| 2016/0285539 A1 | 9/2016 | Sadiq et al. | |
| 2016/0337960 A1 | 11/2016 | Nagasaka et al. | |
| 2016/0353508 A1 | 12/2016 | Gorsuch | |
| 2017/0048367 A1* | 2/2017 | Kärkkäinen | H04M 3/42076 |
| 2017/0150527 A1* | 5/2017 | Duval | H04W 74/0816 |
| 2017/0245132 A1 | 8/2017 | Tsuchie | |
| 2017/0245254 A1* | 8/2017 | Kitagawa | H04W 8/00 |
| 2017/0245295 A1* | 8/2017 | Jung | H04W 72/569 |
| 2017/0273016 A1 | 9/2017 | Nagasaka et al. | |
| 2017/0289896 A1 | 10/2017 | Onishi et al. | |
| 2017/0325243 A1* | 11/2017 | Yasukawa | H04L 5/0048 |
| 2017/0332291 A1 | 11/2017 | Sirotkin et al. | |
| 2017/0353381 A1* | 12/2017 | Qi | H04W 40/24 |
| 2017/0353777 A1 | 12/2017 | Mach et al. | |
| 2018/0019839 A1* | 1/2018 | Chen | H04L 1/0038 |
| 2018/0020383 A1 | 1/2018 | Sirotkin et al. | |
| 2018/0027429 A1 | 1/2018 | Li et al. | |
| 2018/0070264 A1* | 3/2018 | Saiwai | H04W 72/04 |

(56) References Cited

U.S. PATENT DOCUMENTS

| | | | |
|---|---|---|---|
| 2018/0176927 A1 | 6/2018 | Deng et al. | |
| 2018/0219660 A1* | 8/2018 | Cezanne | H04W 72/04 |
| 2018/0279096 A1 | 9/2018 | Wu et al. | |
| 2018/0279152 A1* | 9/2018 | Kim | H04B 7/00 |
| 2018/0284291 A1 | 10/2018 | Marmet et al. | |
| 2018/0310293 A1 | 10/2018 | Lee et al. | |
| 2018/0317067 A1 | 11/2018 | Ameixieira | |
| 2018/0368048 A1 | 12/2018 | Tsuchie | |
| 2019/0037511 A1* | 1/2019 | Liu | H04W 72/30 |
| 2019/0075601 A1* | 3/2019 | Cho | H04W 72/0446 |
| 2019/0081884 A1* | 3/2019 | Spohn | H04L 45/125 |
| 2019/0116609 A1 | 4/2019 | Feng et al. | |
| 2019/0124696 A1* | 4/2019 | Islam | H04W 92/20 |
| 2019/0215670 A1 | 7/2019 | Ameixieira | |
| 2019/0246378 A1* | 8/2019 | Islam | H04L 1/1819 |
| 2019/0297629 A1* | 9/2019 | Lin | H04W 48/16 |
| 2019/0335455 A1* | 10/2019 | Legg | H04W 72/121 |
| 2019/0349951 A1 | 11/2019 | Ahmad | |
| 2019/0364492 A1 | 11/2019 | Azizi et al. | |
| 2019/0373493 A1 | 12/2019 | Uchiyama et al. | |
| 2019/0380121 A1 | 12/2019 | Wu et al. | |
| 2019/0387429 A1 | 12/2019 | Basu Mallick et al. | |
| 2020/0021941 A1 | 1/2020 | Nguyen et al. | |
| 2020/0023862 A1 | 1/2020 | Rodriguez Bravo et al. | |
| 2020/0029184 A1 | 1/2020 | Yamada et al. | |
| 2020/0029302 A1* | 1/2020 | Cox | H04W 52/0216 |
| 2020/0068365 A1 | 2/2020 | Esselink et al. | |
| 2020/0092685 A1 | 3/2020 | Fehrenbach et al. | |
| 2020/0100088 A1 | 3/2020 | Kim et al. | |
| 2020/0107399 A1 | 4/2020 | Pu et al. | |
| 2020/0154333 A1* | 5/2020 | Paladugu | H04B 7/0452 |
| 2020/0178307 A1* | 6/2020 | Ohara | H04W 56/001 |
| 2020/0187245 A1 | 6/2020 | Fujishiro et al. | |
| 2020/0205062 A1 | 6/2020 | Azizi et al. | |
| 2020/0207343 A1 | 7/2020 | Vassilovski et al. | |
| 2020/0220693 A1* | 7/2020 | Babaei | H04L 1/1812 |
| 2020/0228578 A1* | 7/2020 | Jia | H04L 65/1016 |
| 2020/0229124 A1* | 7/2020 | Soriaga | H04W 4/023 |
| 2020/0235874 A1* | 7/2020 | Yeo | H04W 72/23 |
| 2020/0288374 A1 | 9/2020 | Henry et al. | |
| 2020/0296795 A1* | 9/2020 | Uchiyama | H04B 7/15528 |
| 2020/0314608 A1 | 10/2020 | Harada et al. | |
| 2020/0322021 A1* | 10/2020 | Choi | H04W 72/044 |
| 2020/0344708 A1* | 10/2020 | Liao | H04W 72/02 |
| 2020/0404571 A1 | 12/2020 | Lin et al. | |
| 2021/0006372 A1* | 1/2021 | Cha | H04L 5/0048 |
| 2021/0020044 A1 | 1/2021 | Adkar et al. | |
| 2021/0037445 A1* | 2/2021 | Abedini | H04L 5/0048 |
| 2021/0037537 A1* | 2/2021 | Stathakis | H04L 5/0005 |
| 2021/0058905 A1* | 2/2021 | Ganesan | H04L 1/1685 |
| 2021/0099265 A1* | 4/2021 | Shin | H04W 72/0453 |
| 2021/0105062 A1* | 4/2021 | Abedini | H04W 72/20 |
| 2021/0143959 A1* | 5/2021 | Xu | H04W 8/005 |
| 2021/0144750 A1* | 5/2021 | Cao | H04W 72/0453 |
| 2021/0171055 A1 | 6/2021 | Rodriguez Bravo et al. | |
| 2021/0176774 A1 | 6/2021 | Feng et al. | |
| 2021/0185717 A1* | 6/2021 | Dudda | H04W 72/0446 |
| 2021/0195498 A1* | 6/2021 | Otsuya | H04L 45/121 |
| 2021/0227527 A1* | 7/2021 | Xue | H04W 72/51 |
| 2021/0251023 A1* | 8/2021 | Phan | H04W 4/70 |
| 2021/0258907 A1* | 8/2021 | Jiang | H04W 4/023 |
| 2021/0312806 A1 | 10/2021 | Kulakov | |
| 2021/0314730 A1 | 10/2021 | Nguyen et al. | |
| 2021/0314982 A1* | 10/2021 | Panteleev | H04L 5/0044 |
| 2021/0337365 A1 | 10/2021 | Esselink et al. | |
| 2021/0385851 A1* | 12/2021 | Chen | H04L 1/1812 |
| 2021/0409243 A1* | 12/2021 | Yang | H04L 41/0806 |
| 2022/0038931 A1* | 2/2022 | Kuru | H04L 1/0026 |
| 2022/0070865 A1* | 3/2022 | Cui | H04W 72/0453 |
| 2022/0086679 A1* | 3/2022 | Briggs | H04W 72/543 |
| 2022/0095250 A1 | 3/2022 | Lee et al. | |
| 2022/0103243 A1* | 3/2022 | Damnjanovic | H04B 7/15507 |
| 2022/0103247 A1* | 3/2022 | Abedini | H04W 72/0473 |
| 2022/0132544 A1* | 4/2022 | Elshafie | H04L 1/1614 |
| 2022/0174736 A1* | 6/2022 | Oviedo | H04W 52/0238 |

| | | | |
|---|---|---|---|
| 2022/0191864 A1* | 6/2022 | Talarico | H04W 72/0446 |
| 2022/0200742 A1* | 6/2022 | Li | H04W 72/51 |
| 2022/0217771 A1* | 7/2022 | Liu | H04L 5/16 |
| 2022/0256587 A1 | 8/2022 | Fujishiro et al. | |
| 2022/0272745 A1* | 8/2022 | Ma | H04W 72/04 |
| 2022/0279609 A1 | 9/2022 | Wu et al. | |
| 2022/0286868 A1* | 9/2022 | Kim | H04L 1/0075 |
| 2022/0322359 A1* | 10/2022 | Ye | H04W 72/0446 |
| 2022/0330282 A1* | 10/2022 | Kim | H04L 1/1642 |
| 2022/0337990 A1 | 10/2022 | Ebrahim Rezagah et al. | |
| 2022/0338222 A1* | 10/2022 | Kim | H04L 1/08 |
| 2022/0338242 A1* | 10/2022 | Guo | H04L 5/0094 |
| 2022/0365163 A1* | 11/2022 | Baek | H04W 4/40 |
| 2022/0369215 A1 | 11/2022 | Dees et al. | |
| 2022/0408226 A1 | 12/2022 | Fehrenbach et al. | |
| 2023/0050943 A1* | 2/2023 | Luo | H04W 72/542 |
| 2023/0053351 A1* | 2/2023 | Cheng | H04W 8/005 |
| 2023/0055280 A1* | 2/2023 | Hwang | H04L 1/1812 |
| 2023/0056831 A1* | 2/2023 | Manolakos | H04L 5/0051 |
| 2023/0069425 A1* | 3/2023 | Zhao | H04W 72/20 |
| 2023/0106098 A1* | 4/2023 | Wang | H04L 1/1854 |
| | | | 370/329 |
| 2023/0138578 A1 | 5/2023 | Azizi et al. | |
| 2023/0156691 A1 | 5/2023 | Feng et al. | |
| 2023/0180178 A1* | 6/2023 | Yang | H04W 88/04 |
| | | | 455/458 |
| 2023/0232370 A1* | 7/2023 | Yang | H04B 17/27 |
| | | | 370/329 |
| 2023/0239714 A1* | 7/2023 | Fujishiro | H04W 4/40 |
| | | | 370/329 |
| 2023/0247518 A1* | 8/2023 | Zhang | H04W 40/20 |
| | | | 370/328 |
| 2023/0247695 A1 | 8/2023 | Fujishiro et al. | |
| 2023/0262749 A1 | 8/2023 | Ahmad | |
| 2023/0262835 A1 | 8/2023 | Li et al. | |
| 2023/0262842 A1 | 8/2023 | Uchiyama et al. | |
| 2023/0269730 A1 | 8/2023 | Sun et al. | |
| 2023/0276502 A1* | 8/2023 | Zuo | H04W 74/006 |
| | | | 370/329 |
| 2023/0284046 A1* | 9/2023 | Ly | H04W 36/08 |
| | | | 370/329 |
| 2023/0292233 A1* | 9/2023 | Cheng | H04W 76/14 |
| 2023/0292234 A1* | 9/2023 | Chang | H04W 76/14 |
| 2023/0309009 A1* | 9/2023 | Back | H04W 48/20 |
| 2023/0328725 A1* | 10/2023 | Xu | H04L 1/1854 |
| | | | 370/329 |
| 2023/0353305 A1* | 11/2023 | Liu | H04W 52/0235 |
| 2024/0015637 A1* | 1/2024 | Cheng | H04W 12/0471 |
| 2024/0031888 A1* | 1/2024 | Cheng | H04W 48/12 |
| 2024/0031891 A1* | 1/2024 | Cheng | H04W 36/033 |
| 2024/0048524 A1* | 2/2024 | Mihály | H04L 61/4511 |
| 2024/0056166 A1* | 2/2024 | Chang | H04W 40/22 |
| 2024/0064606 A1* | 2/2024 | Yang | H04W 40/22 |
| 2024/0064764 A1* | 2/2024 | Yamamoto | H04W 72/0446 |
| 2024/0064838 A1* | 2/2024 | Orsino | H04W 40/36 |
| 2024/0073889 A1* | 2/2024 | Yuan | H04W 72/1268 |
| 2024/0080722 A1* | 3/2024 | Teyeb | H04W 36/0066 |
| 2024/0121677 A1* | 4/2024 | Wu | H04W 36/0079 |
| 2024/0259906 A1* | 8/2024 | Freda | H04W 36/302 |

FOREIGN PATENT DOCUMENTS

| | | |
|---|---|---|
| JP | 2007096917 A | 4/2007 |
| JP | 2007534222 A | 11/2007 |
| JP | 2009212753 A | 9/2009 |
| JP | 2011049929 A | 3/2011 |
| JP | 2012004891 A | 1/2012 |
| JP | 2012216887 A | 11/2012 |
| JP | 2013038652 A | 2/2013 |
| JP | 2013141126 A | 7/2013 |
| JP | 2013197887 A | 9/2013 |
| JP | 2014534681 A | 12/2014 |
| JP | 2015534355 A | 11/2015 |
| JP | 2016134755 A | 7/2016 |
| JP | 2017076981 A | 4/2017 |
| JP | 2017184051 A | 10/2017 |
| JP | 2018528684 A | 9/2018 |
| JP | 2019516282 A | 6/2019 |

(56)　　　　　References Cited

FOREIGN PATENT DOCUMENTS

| WO | 2005050965 A1 | 6/2005 |
|----|---------------|--------|
| WO | 2013054722 A1 | 4/2013 |
| WO | 2014043500 A1 | 3/2014 |
| WO | 2017166260 A1 | 10/2017 |
| WO | 2018056386 A1 | 3/2018 |
| WO | 2018/125686 A2 | 7/2018 |
| WO | 2018/200438 A1 | 11/2018 |
| WO | 2018/202797 A1 | 11/2018 |
| WO | 2018/202798 A1 | 11/2018 |
| WO | 2019031427 A1 | 2/2019 |
| WO | 2021001086 A1 | 1/2021 |
| WO | 2021/022443 A1 | 2/2021 |
| WO | 2022180710 A1 | 9/2022 |
| WO | 2022180711 A1 | 9/2022 |
| WO | 2022180712 A1 | 9/2022 |
| WO | 2022180713 A1 | 9/2022 |
| WO | 2022180714 A1 | 9/2022 |

OTHER PUBLICATIONS

U.S. Appl. No. 63,083,845 Specification (Year: 2020).*
Extended European Search Report for European Patent Application No. 21927815.7 mailed Jan. 3, 2024.
Office Action for U.S. Appl. No. 18/233,544 mailed May 6, 2025.
Extended European Search Report for European Patent Application No. 21927814.0 mailed Feb. 14, 2024.
European Search Report for European Patent Application No. 21927816.5 mailed Dec. 18, 2023.
US Office Action for U.S. Appl. No. 18/233,544 mailed Dec. 13, 2023.
US Office Action for U.S. Appl. No. 18/233,544 mailed Oct. 18, 2024.
Extended European Search Report for European Patent Application No. 21927816.5 mailed Feb. 29, 2024.
Extended European Search Report for European Patent Application No. 21927812.4 mailed Feb. 28, 2024.
Extended European Search Report for European Patent Application No. 21927813.2 mailed Jan. 26, 2024.
US Office Action for U.S. Appl. No. 18/233,544 mailed Jun. 12, 2024.
Miyakita et al., Basic Study on Mobile Network Problems., IEICE Technical Report. Oct. 20, 2016, vol. 116, No. 272, pp. 85-90, section 1, Japan. (with partial English Translation).
Yamamura et al., Cost Efficient Data Transfer with Heterogeneous Wireless Networks., IEICE Technical Report. Feb. 28, 2013, vol. 112, No. 463, sections 2, 3, Japan. (with partial English Translation).
International Search Report for PCT/JP2021/006978 mailed Apr. 27, 2021 with partial English Translation. (from 170809-1200).
International Search Report for PCT/JP2021/006982 mailed May 25, 2021 with partial English Translation. (from 170809-1210).
International Search Report for PCT/JP2021/006981 mailed May 25, 2021 with partial English Translation. (from 170809-1220).
International Search Report for PCT/JP2021/006979 mailed Apr. 27, 2021 with partial English Translation. (from 170809-1230).
International Search Report for PCT/JP2021/006980 mailed May 18, 2021 with partial English Translation. (from 170809-1240).
U.S. Appl. No. 18/233,523, filed Aug. 14, 2023.
U.S. Appl. No. 18/233,534, filed Aug. 14, 2023.
U.S. Appl. No. 18/233,544, filed Aug. 15, 2023.
U.S. Appl. No. 18/234,118, filed Aug. 15, 2023.
Office Action mailed Dec. 11, 2025 for U.S. Appl. No. 18/233,534.
Office Action for U.S. Appl. No. 18/233,523 mailed Oct. 23, 2025.
Office Action for U.S. Appl. No. 18/234,118 mailed Sep. 8, 2025.
Office Action for U.S. Appl. No. 18/234,118 mailed Mar. 17, 2026.

* cited by examiner

F I G. 1
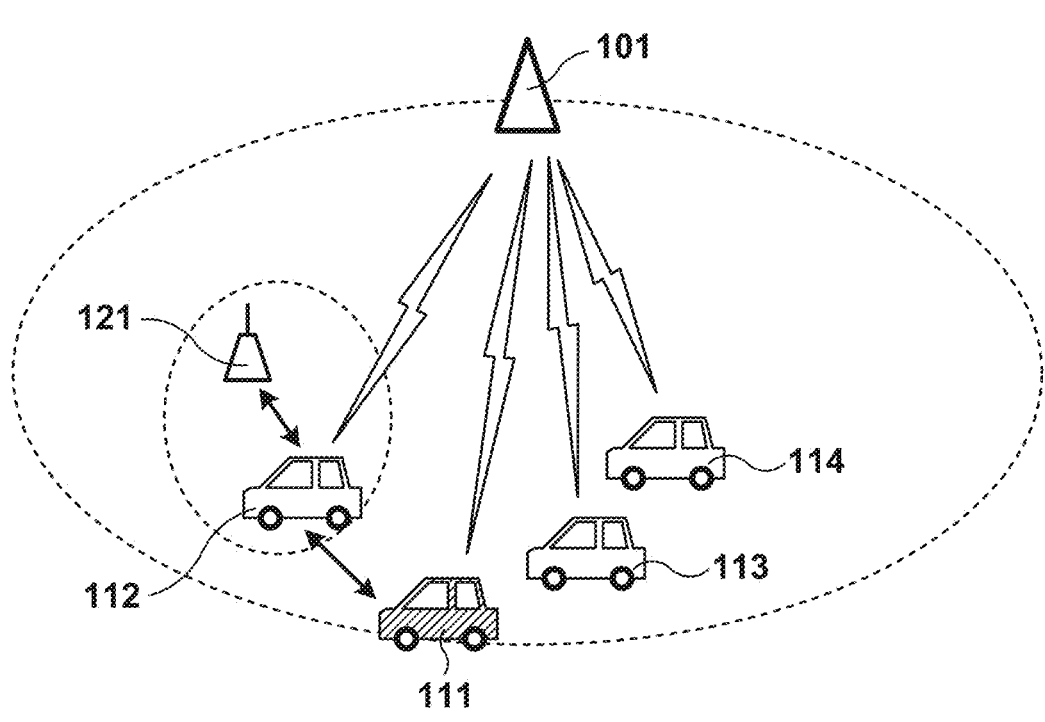
F I G. 2
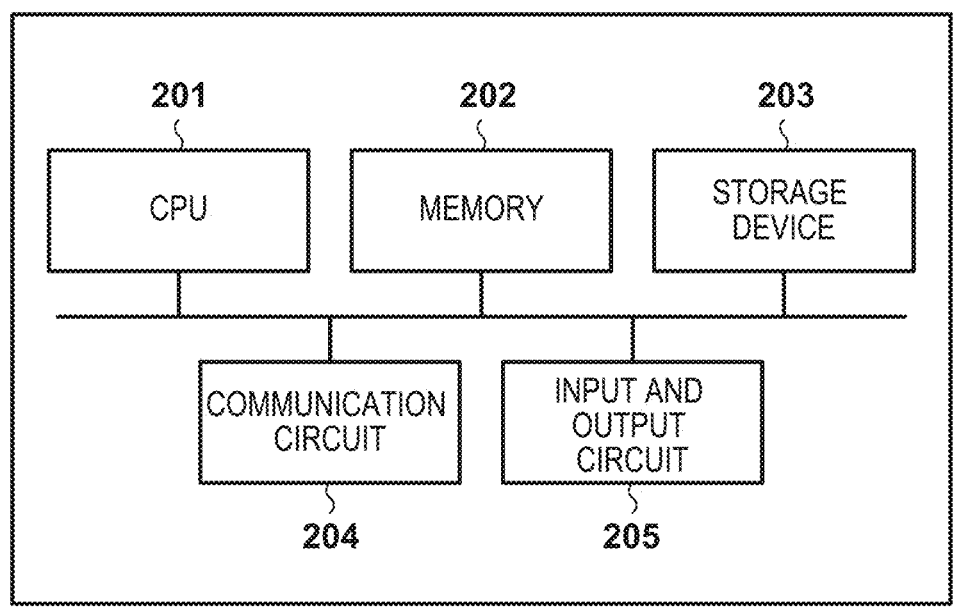

F I G. 5
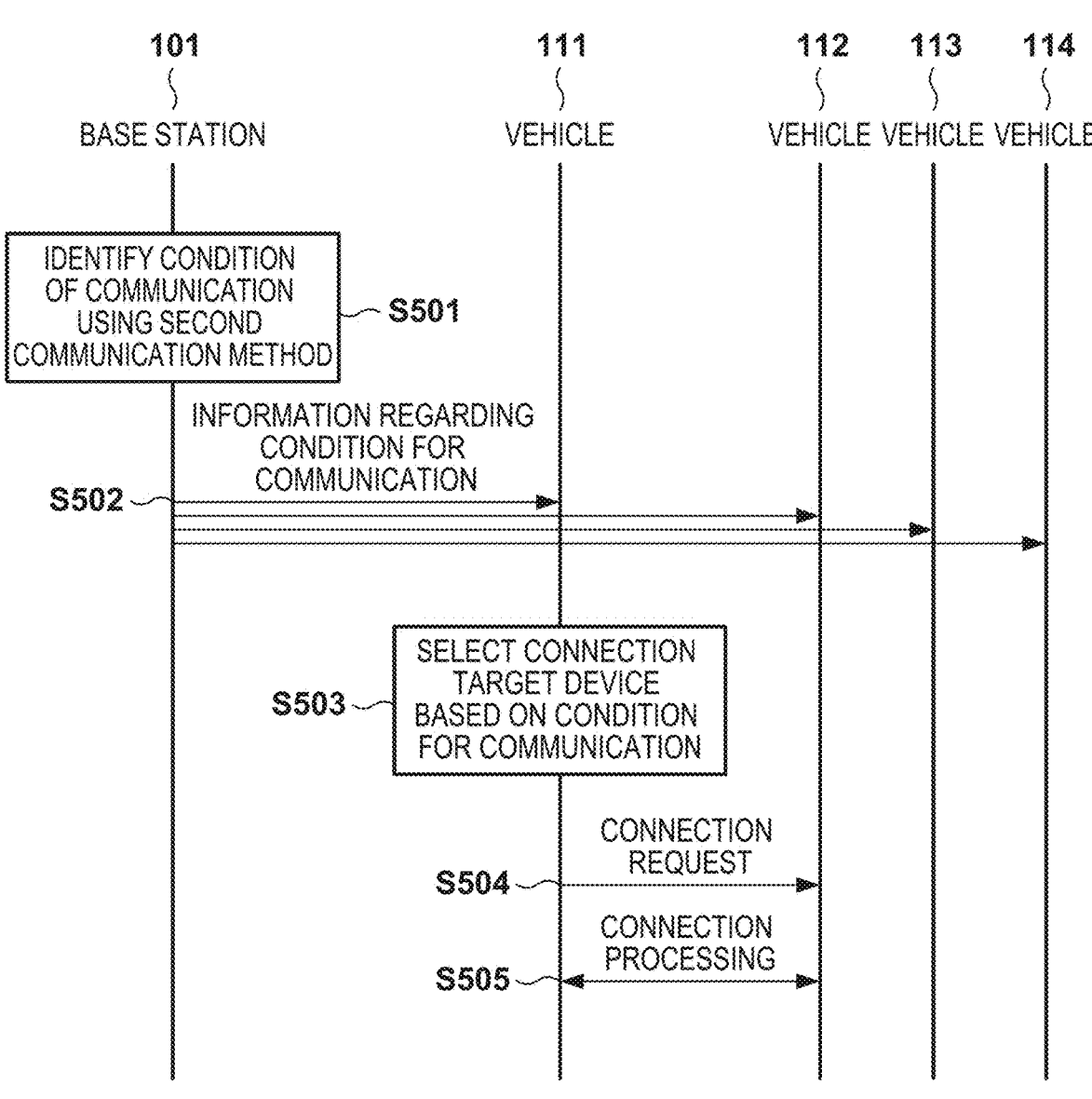

COMMUNICATION DEVICE, BASE STATION, CONTROL METHOD, AND COMPUTER-READABLE STORAGE MEDIUM FOR SELECTING A SECOND DEVICE FOR RELAYING COMMUNICATION BETWEEN DEVICES

CROSS-REFERENCE TO RELATED APPLICATION(S)

This application is a continuation of International Patent Application No. PCT/JP2021/006980 filed on Feb. 25, 2021, the entire disclosures of which is incorporated herein by reference.

BACKGROUND OF THE INVENTION

Field of the Invention

The present invention relates to a communication device, a base station, a control method, and a computer-readable storage medium, and particularly relates to a technique for selecting a communication partner.

Description of the Related Art

Vehicle-to-Everything (V2X) communication, by which a vehicle communicates wirelessly with another vehicle or an object, enables the vehicle to acquire various types of information or to provide information to others. When a vehicle transmits data to a device such as a server on the Internet or a network constructed by a service provider, the vehicle has to connect to a predetermined communication device connectable to such a network, for example, a base station or the like of a cellular communication network. However, in a case where a large number of vehicles communicate with such a predetermined communication device, wireless resources and arithmetic resources such as frequency and time related to communication of the predetermined communication device are insufficient, and it may not be possible to perform the communication with sufficient quality. For this reason, the vehicle is capable of connecting to another device by using a communication method different from that of the predetermined communication device, and transmitting and receiving data through such another device.

On the other hand, for example, in a case where a vehicle connects to a specific device (in one example, a device such as an access point of a wireless LAN) other than a base station of a cellular communication network by using a different communication method, an area where it is possible to connect to such a specific device may be extremely limited, unlike the cellular communication network covering a geographically wide area. For this reason, it is supposed that a vehicle communicates with a predetermined communication device through, for example, another vehicle capable of connecting to such a predetermined communication device. Japanese Patent Laid-Open No. 2017-184051 describes a configuration for connecting between vehicles to transfer data to a predetermined node. In Japanese Patent Laid-Open No. 2017-184051, a vehicle close to the predetermined node is identified by communication between the vehicles, and data is transferred to the vehicle close to the predetermined node.

When a communication device establishes a connection with another device in order to communicate with a predetermined device, it is supposed that the communication device is incapable of recognizing whether such another device is connectable to the predetermined device. For example, also in the technique of Japanese Patent Laid-Open No. 2017-184051, the vehicle close in distance to a predetermined node is not always capable of communicating with the predetermined node. In one example, even for a vehicle that is relatively close in distance to the predetermined node, there may be a case where the distance to the predetermined node is apart to an extent that it is impossible to ensure wireless quality sufficiently or a case where the vehicle is in communication and is incapable of relaying the communication. In addition, there is also a possibility that the information that a connection target vehicle is close to the predetermined node is false. In this case, after the communication device connects to another device, such another device is incapable of connecting to the predetermined device, and the communication device may have to change the connection target of another device. In addition, also in a case where relay transmission is not performed, for example, in a case where an area or the like where the communication in a communication method used by the communication device is not permitted is defined, it is not possible to establish a connection with a partner device in an aspect in which the communication device cannot recognize, in some cases. Such cases may degrade convenience of communication.

SUMMARY OF THE INVENTION

The present invention provides a technique for improving convenience of communication.

A communication device according to one aspect of the present invention is a communication device that performs communication wirelessly, the communication device being configured to: receive by using a first communication method, from a first another device, information regarding a condition for communication in a second communication method within a geographical range where communication with the first another device is possible, the second communication method being different from the first communication method; and select a second another device that performs the communication in the second communication method, based on the information regarding the condition.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a diagram illustrating a system configuration example.

FIG. 2 is a diagram illustrating a hardware configuration example of a base station and a communication device.

FIG. 5 is a diagram illustrating an example of a flow of processing performed in the system.

DESCRIPTION OF THE EMBODIMENTS

Figure 3:
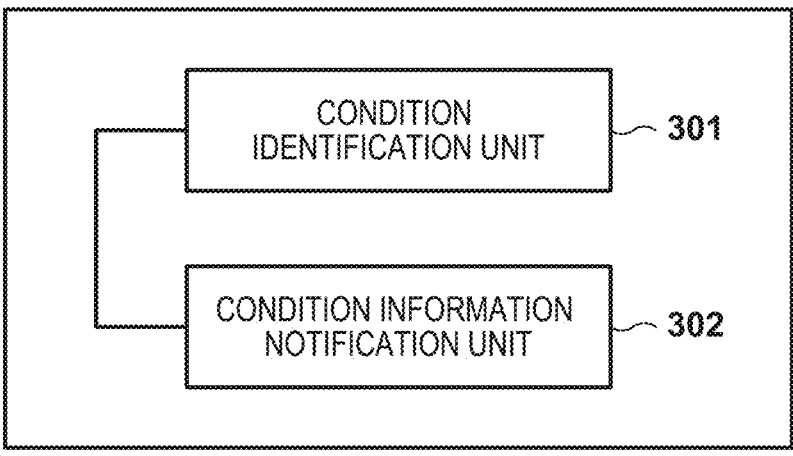
FIG. 3 is a diagram illustrating a functional configuration example of the base station.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(System Configuration)

FIG. 1 illustrates a configuration example of a system in the present embodiment. The present system is a wireless communication system in which vehicles 111 to 114, which are capable of performing wireless communication, connect to a predetermined network such as the Internet, and perform communication. The vehicles 111 to 114 according to the present embodiment connect to a base station 101 of a cellular communication system, for example, and perform communication with a predetermined communication device. In addition, the vehicles 111 to 114 are, for example, configured to be capable of communicating with each other by connecting to each other in a communication method different from the cellular communication method for communicating with the base station 101. Here, the communication method different from the cellular communication method is, for example, any communication method of cellular Vehicle-to-Everything (V2X), wireless LAN, Dedicated Short Range Communications (DSRC), and Bluetooth (registered trademark). Note that although the cellular V2X is one aspect of the cellular communication method, it is not used for the communication between the base station and the terminal (that is, the vehicle 111 to the vehicle 114), but is used for the communication between a device other than the base station and the terminal (the vehicle 111 to the vehicle 114). Therefore, these communication methods are treated as different communication methods throughout the present embodiment and the scope of claims. Note that a combination of the cellular communication method and any other communication method is an example, and the vehicles 111 to 114 are configured to connect to a first device such as the base station 101 in a first communication method, and to be connectable with each other in a second communication method different from the first communication method. Note that in FIG. 1, only one base station 101 and four vehicles 111 to 114 are illustrated, but it is needless to say that a large number of these devices can be present.

By using the second communication method, the vehicles 111 to 114 are capable of performing, for example, not only vehicle-to-vehicle communication but also communication with another device such as, for example, an access point of a wireless LAN. In one example, it is assumed that the vehicle 112 is present in a location where it is possible to communicate with another device 121 to be fixed in a communication method other than the cellular communication method. In addition, the vehicle 113 and the vehicle 114 are also capable of connecting to and communicating with surrounding devices depending on their locations. Note that FIG. 1 illustrates an example in which the vehicle 112 is directly connectable to another device 121, which is fixed, but there is no intention of being limited to this. For example, the vehicle 112 may be capable of communicating with such another device 121, which is fixed, through a wireless communication device such as further another vehicle. The same applies to other vehicles.

By performing cellular communication with the base station 101, the vehicles 111 to 114 are capable of transmitting, for example, information that has been acquired by sensors of the respective vehicles to a device such as a predetermined information processing server. The information processing server is capable of performing various types of processing such as control for automated driving with this information. In addition, by performing the cellular communication with the base station 101, the vehicles 111 to 114 are capable of acquiring various types of information such as driving control information and service information in accordance with the locations of the vehicles from a server that holds, for example, predetermined information. On the other hand, in an environment in which a large number of vehicles communicate in parallel, the communication capacity that can be provided by the base station 101 may be insufficient. For this reason, in the present embodiment, for example, the communication of the communication device (for example, the vehicle 112) connectable to the device 121 in a communication method, which is different from the cellular communication method, is performed with the device 121 so as to offload the communication. In addition, communication of the vehicle 111 is offloaded to another device through the other vehicles 112 to 114. Note that communication of the vehicle 113 and the vehicle 114 can be similarly offloaded through another vehicle or another device.

Here, focusing on the vehicle 111, the vehicle 111 establishes a connection with a vehicle in the surroundings, and communicates with a predetermined device such as a server on the Internet through the connection. For this purpose, the vehicle 111 transmits a connection request for requesting another vehicle in the surroundings to relay the communication, and establishes a connection. At this time, the vehicle 111 can, for example, establish a connection with another vehicle having good wireless quality of communication with the vehicle 111 in the second communication method. However, in some cases, such another vehicle cannot communicate with the predetermined device that is a communication partner with sufficient quality. For example, there may be a case where in the surroundings, there is no vehicle connectable to a device such as the device 121, which is capable of communicating with a predetermined device. In addition, for example, in a case where the communication of the vehicle 111 requests a low delay, even though the wireless quality is good, when a communication path with a large number of hops is selected, the request for the delay cannot be satisfied, in some cases. In such cases, the vehicle 111 attempts communication with the predetermined device through such another vehicle. After recognizing that the requested quality is not satisfied, the vehicle 111 disconnects from such another vehicle, and attempts a connection to any other vehicle. As a result, it is not possible for the vehicle 111 to communicate with the predetermined device in a timely manner. Further, in a case where the connected vehicle is a communication device that is not reliable, such as, for example, a device of a wiretapper, the vehicle 111 will be harmed by connecting to such a vehicle. Furthermore, also focusing on the vehicle 112, there may be a case where it is not possible to know before the connection whether the device 121 is a device capable of communicating with the predetermined device, whether it is a reliable device, or the like.

For this reason, in the present embodiment, information regarding a condition for communication, such as whether each vehicle is capable of performing communication using the second communication method with the predetermined device to be a communication partner, is acquired by use of the first communication method. In the example of FIG. 1, by using the first communication method such as the cellular communication method, the vehicle 111 to the vehicle 114 acquire, from the base station 101, the information regarding the condition for the communication in the second communication method such as a wireless LAN within a geographical range where communication with the base station 101 is enabled. For example, the base station 101 can notify, by a broadcast signal, a communication device in its coverage area of at least a part of the information regarding the condition for the communication in the second communication method within the coverage area of a cell formed by the self-device. In addition, for example, the base station 101 can notify, by an individual signal, a communication device in connection with the self-device of at least a part of the information regarding the condition for the communication in the second communication method within the coverage area of the cell formed by the self-device. In one example, the base station 101 may transmit, by a broadcast signal, a part of the information to a communication device within the coverage area, and may notify, by an individual signal, a remaining part of the information to the communication device in connection. Then, the vehicle 111 to the vehicle 114 respectively select partner devices to communicate with in the second communication method, based on the condition for the communication. For example, the vehicle 111 can select a device that relays the communication of the self-device, based on the condition that has been acquired. In addition, the vehicle 112 can determine whether to establish a connection with the device 121, based on the condition that has been acquired.

The information regarding the condition includes, for example, a condition about a geographical range where communication in the second communication method is executable within a geographical range where the communication with the base station 101 is enabled. For example, the base station 101 identifies a location where a fixed device (for example, the device 121) that performs communication in the second communication method is present within a coverage area of a cell formed by the self-device, and notifies the vehicle 111 to the vehicle 114 of a predetermined range including the location as the geographical range where the communication in the second communication method is executable. In addition, for example, the base station 101 may collect results that the communication device has attempted the communication in the second communication method in the past within the coverage area of the self-device, and may notify the condition about the geographical range where the communication in the second communication is executable, based on statistics for whether it has been possible to communicate in the second communication method for every geographical area. In addition, for example, in a case where there is a geographical range where the use of the second communication method is prohibited, the base station 101 may notify the vehicle 111 to the vehicle 114 of information regarding the range where the use of the second communication method is prohibited.

The information regarding the condition may include, for example, information indicating at least any of a capacity and a communication amount per unit time to be achievable by a communication device present within a geographical range where the communication with the base station 101 is executable by the relay transmission using the second communication method. For example, the base station 101 can notify the communication device within the coverage area of the self-device of the information of the communication capacity and the communication amount per unit time to be achievable, when the vehicle 112 relays in the second communication method. In one example, the base station 101 can notify the communication device within the coverage area of information of the communication device (for example, the vehicle 112) capable of performing the relay transmission to a device (for example, the device 121) connected with a predetermined network such as the Internet by use of the second communication method. For example, at least any of identification information by which the communication device capable of performing the relay transmission is identifiable, the communication capacity, and the communication amount per unit time can be notified from the base station 101 to the communication device within the coverage area. In addition, in one example, the base station 101 may notify the communication device within the coverage area of information indicating a device (for example, the vehicle 111, the vehicle 113, or the vehicle 114) incapable of performing the relay transmission to the device connected with the predetermined network by using the second communication method. According to this, when offloading using the second communication method, the vehicle 111 to the vehicle 114 are capable of determining whether it is possible to connect to the predetermined network through relaying, in a case where there is no device (for example, the device 121) that is directly connectable using the second communication method and is in connection with the predetermined network in the surroundings. For example, the base station 101 may notify the device (for example, the device 121) in direct connection with the predetermined network of at least any of the communication capacity and the communication amount per unit time to be achievable by the communication using the second communication method. That is, regardless of whether the relay transmission is performed, a device capable of communicating using the second communication method within the coverage area of the base station 101 and the communication capacity or the communication amount per unit time to be achievable by the device may be notified from the base station 101 to the communication device within the coverage area.

In addition, in a case where before a connection with another device is established, the communication device transmits a predetermined signal to such another device in the second communication method, the information regarding the condition may include, for example, information that associates a period from transmission of the predetermined signal to reception of a response to the predetermined signal by another device with communication to be executable when such another device relays the communication between the communication device and the predetermined device that is a communication partner. For example, the vehicle 111 transmits the predetermined signal, before the connection with another device such as the vehicle 112 to the vehicle 114 is established. Such a predetermined signal is a signal for causing the vehicle 112 to the vehicle 114 to transmit a response signal to the vehicle 111 in response to reception of the predetermined signal, and in one example, can be a signal by the vehicle 111 for requesting a connection for relaying the communication with the predetermined device such as a specific server. Upon receiving this predetermined signal, the vehicle 112 to the vehicle 114 control a transmission timing of a response signal to the predetermined signal, based on communication to be executable by the self-device with the predetermined device that is a communication partner of the vehicle 111. The transmission timing here is set to make the time from a reception timing of the predetermined signal shorter, as relay of the communication of the vehicle 111 can be executed on a better condition. In the present embodiment, the information regarding the transmission timing is notified from the base station 101 to the communication device within the coverage area. That is, the base station 101 notifies the communication device within the coverage area of information that associates the time, from when a device that can perform the relay transmission receives the predetermined signal to when the device transmits a response, with the quality of the relay transmission. According to this, the communication device within the coverage area of the base station 101 is capable of estimating the quality of a case where each of the other devices in the surroundings relays the communication of the self-device, based on a difference in time from when the self-device transmits the predetermined signal to when the self-device receives the response.

Note that the time from when the device that can perform the relay transmission receives the predetermined signal to when the device transmits the response can be set shorter, as the device has a higher priority in relaying the communication. According to this, when requesting for relaying, the communication device within the coverage area of the base station 101 is capable of identifying another device having a higher priority, based on a difference in the time from when the self-device transmits the predetermined signal to when the self-device receives the response, and is capable of requesting for relaying to such another device. Note that a transmission timing of the response may be so set that the priority is higher, as the quality of the relay is better. Note that in the above-described example, the description has been given with regard to the case where as the quality of relaying is better or the priority at the time of relaying is higher, the transmission timing of the response is made earlier. However, conversely, the transmission timing of the response may be made later.

In addition, the information regarding the condition may include information that identifies a device permitted to communicate in the second communication method. For example, the base station 101 can identify a reliable device as the device permitted to communicate in the second communication method, and can notify a communication device within the coverage area of the self-device of information indicating the identified device. In this manner, by notifying the communication device within the coverage area of the information that identifies the device permitted to communicate in the second communication method, it is possible to reduce a concern that the communication of the communication device is wiretapped. Here, the base station 101 can set, to be a reliable device, an access point, which has been registered beforehand, of a wireless LAN used in a cooperative operation between a cellular communication system such as a long term evolution (LTE)-wireless LAN (WLAN) aggregation (LWA) and a wireless LAN. In addition, the base station 101 may set a device in connection with such a reliable access point to be the reliable device. Further, the base station 101 may identify a communication device that has been connected with, for example, a cellular network and that has been authenticated beforehand, as a reliable device. According to this, the communication device within the coverage area of the base station 101 becomes capable of selecting and connecting to a device with high reliability. Note that the information regarding the condition may include, for example, information that identifies the device prohibited from communicating in the second communication method. That is, notification in a white list scheme for notifying the information that identifies the device permitted to communicate in the second communication method as described above may be given, or notification in a black list scheme for notifying the information that identifies the device prohibited from communicating in the second communication method may be given. In one example, a device that has failed in authentication, a device that has not been authenticated, or the like can be identified as the device prohibited from communicating in the second communication method.

In addition, the information regarding the condition may include information indicating a frequency that should be used in the communication in the second communication method. Further, the base station 101 may notify the communication device within the coverage area of the information indicating the frequency that should be used when searching for a communication device in the second communication method, as the information regarding the condition. For example, in a case where a restriction is imposed such that only some frequency channels are available from among a plurality of frequency channels supported in the second communication method, information indicating such a restriction may be notified from the base station 101 to the communication device within the coverage area. In addition, in a case where many communication devices that are in communication in some frequency channels are present and a few communication devices that are in communication in the other frequency channels are present, it may be notified that the frequency channels used by such a few communication devices should be used.

Hereinafter, configurations and operations of the base station 101 and the vehicle 111 to the vehicle 114 that perform such processing will be described.

(Device Configuration)

FIG. 2 illustrates a hardware configuration example of the base station 101 and the vehicle 111 to the vehicle 114 according to the present embodiment. The base station 101 and the vehicle 111 to the vehicle 114 each include a general-purpose computer in one example, and the computer includes, for example, a CPU 201, a memory 202, a storage device 203, a communication circuit 204, and an input and output circuit 205. Note that FIG. 2 illustrates a configuration example of hardware according to the present embodiment, and illustrations of the other configurations such as a configuration of the base station 101 as a general base station and configurations of the vehicle 111 to the vehicle 114 as vehicles are omitted. The CPU 201 executes, for example, a program stored in the memory 202 to perform processing to be described later and conduct control of the entire device. Note that the CPU 201 can be substituted by any one or more processors such as an MPU and an ASIC. The memory 202 holds a program for causing the base station 101 and the vehicle 111 to the vehicle 114 to perform various types of processing, and also functions as a work memory when the program is executed. In one example, the memory 202 is a random access memory (RAM) or a read-only memory (ROM). The storage device 203 is, for example, a detachable external storage device, a built-in hard disk drive, or the like, and holds various types of information. The communication circuit 204 performs signal processing related to communication, acquires various types of information from an external device through a communication network, and transmits the various types of information to the external device. Note that the information that has been acquired by the communication circuit 204 can be stored in, for example, the memory 202 or the storage device 203. Note that the base station 101 and the vehicle 111 to the vehicle 114 each can include a plurality of communication circuits 204. The input and output circuit 205 controls, for example, outputs of screen information to be displayed on a display device, not illustrated, audio information to be output from a speaker, and receiving of user inputs via a keyboard, a pointing device, or the like. Note that the input and output circuit 205 may control a device that integrally inputs into and outputs from a touch panel or the like. Note that the configuration of FIG. 2 is one example, and for example, the base station 101 and the vehicle 111 to the vehicle 114 each may have dedicated hardware for performing the above-described processing.

FIG. 3 illustrates a functional configuration example of the base station 101 according to the present embodiment. The base station 101 includes, for example, a condition identification unit 301 and a condition information notification unit 302, as its functions. Note that these functional units may be implemented, for example, by the CPU 201 executing a program stored in the memory 202 or the storage device 203, or may be implemented by dedicated hardware.

The condition identification unit 301 identifies a condition when the communication device performs communication using the second communication method, which is different from the first communication method used by the base station 101 for communication with the communication device that is subordinate to the self-device. Examples of this condition can include a condition regarding a geographical range where the communication using the second communication method is executable within the coverage area of the base station 101, a communication capacity or a communication amount per unit time, a relationship between the feasibility or priority of the relay communication and a transmission timing of a response to a predetermined signal, a device permitted to communicate or prohibited from communicating using the second communication method, and a frequency band/frequency channel that should be used for communication or in searching. By using the first communication method, the condition information notification unit 302 notifies the communication device within the coverage area of the base station 101 of the information regarding the condition that has been identified by the condition identification unit 301. The information regarding the condition may be simultaneously notified to a plurality of communication devices by a broadcast signal or a multicast signal, or may be individually notified to each communication device by a unicast signal. Note that since they have been described above, details are not repeated here.

Figure 4:
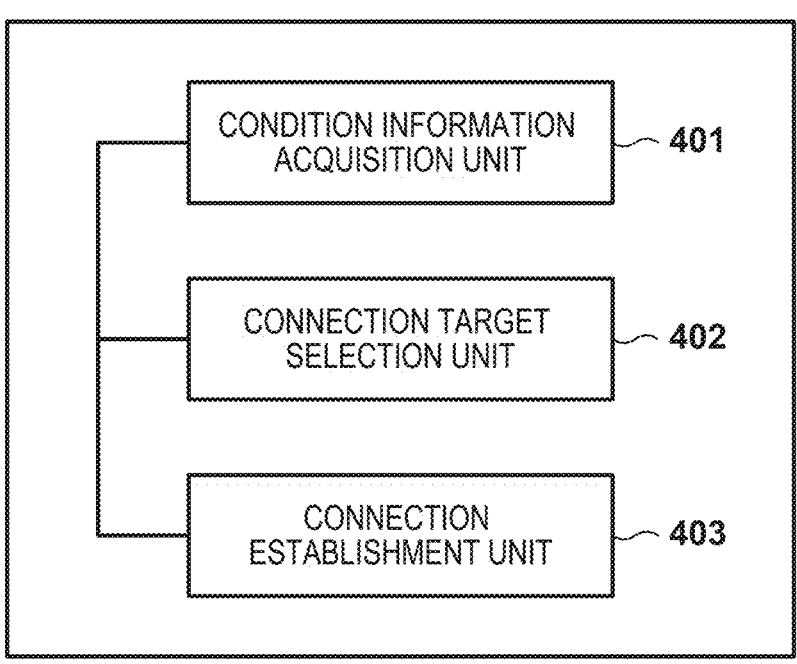
FIG. 4 is a diagram illustrating a functional configuration example of the communication device.

FIG. 4 illustrates a functional configuration example of the vehicle 111 to the vehicle 114 in the present embodiment. The vehicle 111 to the vehicle 114 each include, for example, a condition information acquisition unit 401, a connection target selection unit 402, and a connection establishment unit 403, as its functions. Note that these functional units may be implemented, for example, by the CPU 201 executing a program stored in the memory 202 or the storage device 203, or may be implemented by dedicated hardware.

The condition information acquisition unit 401 acquires information regarding a condition for performing communication using the second communication method that has been notified from the base station 101 using the first communication method. The connection target selection unit 402 selects a connection target device (for example, a requested target for relay transmission), based on the information that has been acquired. By using the information regarding the condition, the connection target selection unit 402 selects a device suitable for the communication using the second communication method, as information of the connection target. Note that this selection can be made in accordance with various criteria depending on the implementation. That is, the selection can be made with reference to the information regarding the condition, but is not limited to such information. The connection establishment unit 403 connects to the connection target device that has been selected by the connection target selection unit 402. For example, the connection establishment unit 403 establishes a connection with another communication device that functions as a relay device in order to request the device to perform relay transmission.

(Flow of Processing)

Next, an example of a flow of processing performed in a wireless communication system will be described. Note that the description has been given with regard to details of the information transmitted and received in each processing procedure to be described later. Therefore, in the description here, only the flow of the processing is outlined, and the detailed description is not repeated. The present processing is implemented by, for example, the CPU 201 executing a program stored in the memory 202 or the storage device 203. Note that here, a description will be given with regard to a flow of processing when the vehicle 111 determines the connection target device and connects to the vehicle 112, which is connectable to the device 121 to make a relay request in order to offload the communication of the vehicle 111. However, this is an example, and similar processing can be performed, also in a case where the vehicle 112 to the vehicle 114 or the like determine the connection target device to make a relay request or in a case where the vehicle 112 determines the device 121 as the connection target device.

First, the base station 101 identifies a condition in a case where the communication device performs communication in the second communication method, which is different from the first communication method to be used when the self-device communicates with a communication device that is a subordinate device within the coverage area of the self-device (S501). As described above, for example, the condition can be at least any of a geographical range where the communication using the second communication method is executable within the coverage area of the base station 101, a communication capacity or a communication amount per unit time, a relationship between the feasibility or priority of the relay communication and a transmission timing of a response to a predetermined signal, a device permitted to communicate or prohibited from communicating using the second communication method, and a frequency band/frequency channel that should be used for communication or in searching. Then, the base station 101 notifies the communication devices (the vehicle 111 to the vehicle 114) within the coverage area of the self-device of the information regarding the condition that has been identified (S502). This notification can be simultaneously given to a plurality of communication devices by a broadcast signal or a multicast signal, but may be individually given to a communication device in connection by a unicast signal.

Here, it is assumed that the communication of user data of the vehicle 111 is offloaded from the communication through the base station 101 using the first communication method to the communication using the second communication method. In one example, the base station 101 can select the communication device (the vehicle 111) present in a location where the communication in the second communication method is executable from the communication devices in communication, based on the condition identified in S501, and can determine to offload the communication of the communication device that has been selected. In this case, the base station 101 can instruct the vehicle 111 to select a connection target in the second communication method and establish a connection. Note that the vehicle 111 may autonomously determine to offload the communication. The vehicle 111 selects a connection target device for the communication using the second communication method, based on at least a part of the information regarding the condition for the communication using the second communication method that has been notified from the base station 101 (S503). Here, it is assumed that the vehicle 111 has identified, for example, the vehicle 112, which has been authenticated, which is reliable, and which enables relaying to the device 121, based on the information that has been acquired, and has determined to connect to the vehicle 112. Then, the vehicle 111 transmits, for example, a connection request to the vehicle 112 (S504), performs connection processing (S505), and performs communication with the vehicle 112 by using the second communication method. Note that in a similar manner, the vehicle 112 can also establish a connection for the communication using the second communication method with the device 121, which is reliable. Note that the communication method used in the communication between the vehicle 112 and the vehicle 111 and the communication method used in the communication between the vehicle 112 and the device 121 may be different from each other.

In this manner, in a procedure according to the present embodiment, when a communication device (for example, the vehicle 111 to the vehicle 114) that is present as subordinate to the base station 101 performs the communication using the second communication method, the communication device is capable of recognizing the condition for the communication before establishing a connection. Accordingly, each communication device is capable of connecting to appropriate another device and offloading data using the second communication method.

SUMMARY OF EMBODIMENTS

1. A communication apparatus according to the embodiments above is:

a communication device that performs communication wirelessly, the communication device being configured to:

receive by using a first communication method, from a first another device, information regarding a condition for communication in a second communication method within a geographical range where communication with the first another device is possible, the second communication method being different from the first communication method; and select a second another device that performs the communication in the second communication method, based on the information regarding the condition.

According to this embodiment, it is possible to recognize the condition for performing the communication in the second communication method within a communicable range of the first another device, without performing processing for establishing a connection. As a result, for example, it is possible to suppress unnecessary signal transmission and reception and unnecessary power consumption caused by performing connection establishment processing in an area where the communication in the second communication method is not executable.

2. In the embodiment according to 1 above, the information regarding the condition includes a condition about a geographical range where the communication in the second communication method is enabled within the geographical range where the communication with the first another device is enabled.

According to this embodiment, the communication device is capable of identifying beforehand the geographical range where the communication in the second communication method is executable. Therefore, after confirming that the self-device is present within such a geographical range, it becomes possible to select the connection target device in the second communication method.

3. In the embodiment according to 1 or 2 above, the information regarding the condition includes information indicating at least any of a capacity and a communication amount per unit time to be achievable when the second another device relays communication between the communication device and a predetermined device in the second communication method.

According to this embodiment, before the communication device is connected with the second another device and the relay transmission is started, it is possible to identify whether the communication capacity or the communication amount per unit time requested by the self-device is achievable in relaying by the second another device. Accordingly, for example, it becomes possible for the communication device to select the second another device capable of achieving the communication capacity or the communication amount per unit time requested by the self-device, and to establish the connection.

4. In the embodiment according to any one of 1 to 3 above, in a case where a predetermined signal is transmitted to the second another device in the second communication method before a connection with the second another device is established, the information regarding the condition includes information that associates a period from when the predetermined signal is transmitted to when the second another device receives a response to the predetermined signal with communication to be enabled when the second another device relays communication between the communication device and the predetermined device.

According to this embodiment, it becomes possible for the communication device to recognize the degree of communication to be executable, when making a request to each of the second another devices to perform relay transmission, based on the reception timing of the response to the predetermined signal to be transmitted before the connection with one or more second another devices in the surroundings and the information that has been acquired.

5. In the embodiment according to 4 above, the predetermined signal is transmitted in the second communication method, and the second another device is selected, based on a timing when the response to the predetermined signal is received.

According to this embodiment, the communication device selects the second another device in accordance with the degree of the communication to be executable in correspond to the reception timing of the response to the predetermined signal. Therefore, it becomes possible to select an appropriate relay device in accordance with the communication requested by the communication device.

6. In the embodiment according to 4 or 5 above, the period is set shorter, as a device has a higher priority in relaying the communication between the communication device and the predetermined device.

According to this embodiment, the reception timing of the response to the predetermined signal becomes earlier, as the device has a higher priority at the time of relaying. Therefore, by receiving a response early from the device having a high priority, the communication device is capable of establishing the connection.

7. In the embodiment according to any one of 1 to 6 above, the information regarding the condition includes information identifying a device permitted to communicate in the second communication method.

According to this embodiment, it becomes possible for the communication device to select a connection target device from devices permitted to communicate in the second communication method.

8. In the embodiment according to 7 above, the device permitted to communicate in the second communication method is a device authenticated beforehand.

According to this embodiment, it becomes possible for the communication device to select a connection target device from reliable devices that have been authenticated beforehand. In other words, it is possible for the communication device to prevent from connecting to an unreliable device.

9. In the embodiment according to any one of 1 to 8 above, the information regarding the condition includes information identifying a device prohibited from communicating in the second communication method.

According to this embodiment, it becomes possible for the communication device to select a connection target device from other devices that have looked into a device to be prohibited from communicating in the second communication method.

10. In the embodiment according to any one of 1 to 9 above, the information regarding the condition includes information indicating a frequency to be used in the communication in the second communication method.

According to this embodiment, the communication device is capable of identifying beforehand the frequency that should be used in the communication in the second communication method. Therefore, it is possible to prevent an attempt to communication or the like on the frequency that should not be used.

11. In the embodiment according to any one of 1 to 10 above, the information regarding the condition includes information indicating a frequency to be used when searching for a communication partner in the second communication method.

According to this embodiment, the communication device is capable of limiting the frequency that should be used when searching for a connection target device. Therefore, searching on a frequency that should not be used can be prevented, and unnecessary waste can be prevented for power saving or the like.

12. In the embodiment according to any one of 1 to 11 above, the first communication method is a cellular communication method performed between a base station and a terminal, the first another device is the base station, and the communication device is the terminal.

According to this embodiment, the information regarding the condition for the communication in the second communication method other than the cellular communication is notified by the cellular communication between the base station and the terminal. According to this, the base station becomes capable of efficiently notifying the communication devices present in a wide range of the condition for the communication in the second communication method.

13. In the embodiment according to any one of 1 to 12 above, at least a part of the information regarding the condition is notified by a broadcast signal.

According to this embodiment, since the information is notified to a plurality of communication devices all at once by a common signal, efficient information transmission can be performed.

14. In the embodiment according to any one of 1 to 13 above, at least a part of the information regarding the condition is notified by an individual signal.

According to this embodiment, the information suitable for each communication device can be individually notified. For example, in accordance with the location where the communication device stays, it becomes possible to notify the condition for the communication in the second communication method with regard to the surroundings of the location.

15. In the embodiment according to any one of 1 to 14 above, the second communication method is a communication method of any of cellular vehicle-to-everything (V2X), a wireless LAN, dedicated short range communication (DSRC), and Bluetooth.

According to this embodiment, the condition when the communication device performs the communication in a relatively short distance is notified beforehand. Therefore, the communication device becomes capable of efficiently establishing the connection and performing the communication by using the information notified beforehand, for example, in a case where a period while such communication can be executed is limited because it is moving.

16. In the embodiment according to any one of 1 to 15 above, the communication device is a vehicle.

According to this embodiment, the communication device becomes capable of efficiently establishing the connection and performing the communication by using the information notified beforehand, for example, in a case where a period while the communication with a specific partner device can be executed in the second communication method is limited because it is traveling.

17. A base station according to the embodiments above is:

a base station that performs communication wirelessly by using a first communication method, the base station being configured to:

transmit information regarding a condition for communication in a second communication method within a geographical range where communication with the base station is enabled, to a communication device present within the geographical range, the second communication method being different from the first communication method.

According to this embodiment, it is possible for the base station to cause the communication device that has not performed the connection establishment processing in the second communication method to recognize the condition for a case where the communication device performs the communication in the second communication method, which is different from the first communication method to be used between the self-device and a subordinate communication device within the communicable range (coverage area) of the self-device. As a result, for example, it is possible for the communication device to suppress unnecessary signal transmission and reception and unnecessary power consumption caused by performing the connection establishment processing in an area where the communication in the second communication method is not executable.

18. In the embodiment according to 17 above, the information regarding the condition includes a condition about a geographical range where the communication device is capable of communicating in the second communication method within the geographical range.

According to this embodiment, the communication device that is subordinate to the base station is capable of identifying beforehand the geographical range where the communication in the second communication method is executable. Therefore, the communication device that is subordinate to the base station is capable of confirming the presence in such a geographical range, and then selecting the connection target device in the second communication method.

19. In the embodiment according to 17 or 18 above, the information regarding the condition includes information indicating at least any of a capacity and a communication amount per unit time to be achievable when another device relays communication between the communication device and a predetermined device in the second communication method.

According to this embodiment, before the communication device that is subordinate to the base station is connected with the second another device and the relay transmission is started, it is possible to identify whether the communication capacity or the communication amount per unit time requested by the self-device is achievable in relaying by the second another device. Therefore, for example, the communication device becomes capable of selecting the second another device with which the communication capacity or the communication amount per unit time requested by the self-device is achievable, and establishing the connection.

20. In the embodiment according to any one of 17 to 19 above, the information regarding the condition includes information that associates a period from transmission of a predetermined signal in the second communication method to reception by another device of a response to the predetermined signal, before the communication device establishes a connection with the another device, with communication to be enabled when the another device relays communication between the communication device and the predetermined device.

According to this embodiment, it becomes possible for the communication device that is subordinate to the base station to recognize the degree of communication to be executable, based on the reception timing of the response to the predetermined signal to be transmitted before the connection with one or more second another devices in the surroundings and the information that has been acquired, when making a request to each of the second another devices to perform relay transmission.

21. In the embodiment according to 20 above, the period is set shorter, as a device has a higher priority in relaying the communication between the communication device and the predetermined device.

According to this embodiment, the reception timing of the response to the predetermined signal becomes earlier, as the device has a higher priority at the time of relaying. Therefore, by receiving a response early from the device having a high priority, the communication device is capable of establishing the connection.

22. In the embodiment according to any one of 17 to 21 above, the information regarding the condition includes information identifying a device permitted to communicate in the second communication method.

According to this embodiment, it becomes possible for the communication device that is subordinate to the base station to select a connection target device from devices permitted to communicate in the second communication method.

23. In the embodiment according to 22 above, the device permitted to communicate in the second communication method is a device authenticated beforehand.

According to this embodiment, it becomes possible for the communication device that is subordinate to the base station to select a connection target device from reliable devices that have been authenticated beforehand. In other words, it is possible for the communication device to prevent from connecting to an unreliable device.

24. In the embodiment according to any one 17 to 23 above, the information regarding the condition includes information identifying a device prohibited from communicating in the second communication method.

According to this embodiment, it becomes possible for the communication device that is subordinate to the base station to select a connection target device from other devices that have looked into a device to be prohibited from communicating in the second communication method.

25. In the embodiment according to any one of 17 to 24 above, the information regarding the condition includes information indicating a frequency to be used in the communication in the second communication method.

According to this embodiment, the communication device that is subordinate to the base station is capable of identifying beforehand the frequency that should be used in the communication in the second communication method. Therefore, it is possible to prevent an attempt to communicate or the like on the frequency that should not be used.

26. In the embodiment according to any one of 17 to 25 above, the information regarding the condition includes information indicating a frequency to be used when the communication device searches for a communication partner in the second communication method.

According to this embodiment, the communication device that is subordinate to the base station is capable of limiting the frequency that should be used when searching for a connection target device. Therefore, searching on a frequency that should not be used can be prevented, and unnecessary waste can be prevented for power saving or the like.

27. In the embodiment according to any one of 17 to 26 above, the first communication method is a cellular communication method performed between a base station and a terminal, and the communication device is the terminal.

According to this embodiment, the information regarding the condition for the communication in the second communication method other than the cellular communication is notified by the cellular communication between the base station and the terminal. According to this, the base station becomes capable of efficiently notifying the communication devices present in a wide range of the condition for the communication in the second communication method.

28. In the embodiment according to any one of 17 to 27 above, at least a part of the information regarding the condition is transmitted by a broadcast signal.

According to this embodiment, since the information is notified to a plurality of communication devices all at once by a common signal, efficient information transmission can be performed.

29. In the embodiment according to any one of 17 to 28 above, at least a part of the information regarding the condition is transmitted by an individual signal.

According to this embodiment, the information suitable for each communication device can be individually notified. For example, in accordance with the location where the communication device stays, it becomes possible to notify the condition for the communication in the second communication method with regard to the surroundings of the location.

30. In the embodiment according to any one of 17 to 29 above, the second communication method is a communication method of any of cellular vehicle-to-everything (V2X), a wireless LAN, dedicated short range communication (DSRC), and Bluetooth.

According to this embodiment, the condition when the communication device that is subordinate to the base station performs the communication in a relatively short distance is notified beforehand. Therefore, the communication device that is subordinate to the base station becomes efficiently establishing the connection and performing the communication by using the information notified beforehand, and increasing the time for actual communication, in a case where a period while such communication is possible is limited because it is moving.

31. A control method according to the embodiment above is:

a control method performed by a communication device that performs communication wirelessly, the control method comprising:

receiving by using a first communication method, from a first another device, information regarding a condition for communication in a second communication method within a geographical range where communication with the first another device is enabled, the second communication method being different from the first communication method; and selecting a second another device that performs the communication in the second communication method, based on the information regarding the condition.

According to this embodiment, it is possible to recognize the condition for performing the communication in the second communication method within a communicable range of the first another device, without performing processing for establishing a connection. As a result, for example, it is possible to suppress unnecessary signal transmission and reception and unnecessary power consumption caused by performing connection establishment processing in an area where the communication in the second communication method is not executable.

32. A control method according to the embodiment above is:

a control method performed by a base station that performs communication wirelessly by using a first communication method, the control method comprising:

transmitting information regarding a condition for communication in a second communication method within a geographical range where communication with the base station is enabled, to a communication device present within the geographical range, the second communication method being different from the first communication method.

According to this embodiment, it is possible for the base station to cause the communication device that has not performed the connection establishment processing in the second communication method to recognize the condition for a case where the communication device performs the communication in the second communication method, which is different from the first communication method to be used between the self-device and a subordinate communication device within the communicable range (coverage area) of the self-device. As a result, for example, it is possible for the communication device to suppress unnecessary signal transmission and reception and unnecessary power consumption caused by performing the connection establishment processing in an area where the communication in the second communication method is not executable.

33. A program according to the embodiment above is:

a program for causing a computer included in a communication device that performs communication wirelessly to:

receive by using a first communication method, from a first another device, information regarding a condition for communication in a second communication method within a geographical range where communication with the first another device is enabled, the second communication method being different from the first communication method; and select a second another device that performs the communication in the second communication method, based on the information regarding the condition.

According to this embodiment, it is possible to recognize the condition for performing the communication in the second communication method within a communicable range of the first another device, without performing processing for establishing a connection. As a result, for example, it is possible to suppress unnecessary signal transmission and reception and unnecessary power consumption caused by performing connection establishment processing in an area where the communication in the second communication method is not executable.

34. A program according to the embodiment above is:

a program for causing a computer included in a base station that performs communication wirelessly by using a first communication method to transmit information regarding a condition for communication in a second communication method within a geographical range where communication with the base station is enabled, to a communication device present within the geographical range, the second communication method being different from the first communication method.

According to this embodiment, it is possible for the base station to cause the communication device that has not performed the connection establishment processing in the second communication method to recognize the condition for a case where the communication device performs the communication in the second communication method, which is different from the first communication method to be used between the self-device and a subordinate communication device within the communicable range (coverage area) of the self-device. As a result, for example, it is possible for the communication device to suppress unnecessary signal transmission and reception and unnecessary power consumption caused by performing the connection establishment processing in an area where the communication in the second communication method is not executable.

The invention is not limited to the foregoing embodiments, and various variations/changes are possible within the spirit of the invention.

What is claimed is:

1. A communication device that performs communication wirelessly, the communication device comprising:

at least one memory that stores a set of instructions; and at least one processing circuit, wherein the communication device is caused, by the at least one processing circuit executing the instructions, to perform operations comprising:

receiving by using a first communication method, from a first another device, information regarding a condition for communication in a second communication method within a geographical range where communication with the first another device is possible, the second communication method being different from the first communication method; and selecting a second another device that performs the communication in the second communication method, based on the information regarding the condition, wherein, in a case where a predetermined signal is transmitted to the second another device in the second communication method before a connection with the second another device is established, the information regarding the condition includes information that associates a period from when the predetermined signal is transmitted to when a response, by the second another device, to the predetermined signal is received with communication to be enabled when the second another device relays communication between the communication device and a predetermined device.

2. The communication device according to claim 1, wherein the information regarding the condition includes a condition about a geographical range where the communication in the second communication method is enabled within the geographical range where the communication with the first another device is enabled.

3. The communication device according to claim 1, wherein the information regarding the condition includes information indicating at least any of a capacity and a communication amount per unit time to be achievable when the second another device relays communication between the communication device and a predetermined device in the second communication method.

4. The communication device according to claim 1, wherein the predetermined signal is transmitted in the second communication method, and the second another device is selected, based on a timing when the response to the predetermined signal is received.

5. The communication device according to claim 1, wherein the period is set shorter, as a device has a higher priority in relaying the communication between the communication device and the predetermined device.

6. A base station that performs communication wirelessly by using a first communication method, the base station comprising:

at least one memory that stores a set of instructions; and at least one processing circuit, wherein the communication device is caused, by the at least one processing circuit executing the instructions, to perform operations comprising:

transmitting information regarding a condition for communication in a second communication method within a geographical range where communication with the base station is enabled, to a communication device present within the geographical range, the second communication method being different from the first communication method, wherein the information regarding the condition includes information that associates a period from transmission of a predetermined signal in the second communication method to reception by another device of a response to the predetermined signal, before the communication device establishes a connection with the another device, with communication to be enabled when the another device relays communication between the communication device and a predetermined device.

7. The base station according to claim 6, wherein the information regarding the condition includes a condition about a geographical range where the communication device is capable of communicating in the second communication method within the geographical range.

8. The base station according to claim 6, wherein the information regarding the condition includes information indicating at least any of a capacity and a communication amount per unit time to be achievable when another device relays communication between the communication device and a predetermined device in the second communication method.

9. The base station according to claim 6, wherein the period is set shorter, as a device has a higher priority in relaying the communication between the communication device and the predetermined device.

10. A control method performed by a communication device that performs communication wirelessly, the control method comprising:

receiving by using a first communication method, from a first another device, information regarding a condition for communication in a second communication method within a geographical range where communication with the first another device is enabled, the second communication method being different from the first communication method; and selecting a second another device that performs the communication in the second communication method, based on the information regarding the condition, wherein, in a case where a predetermined signal is transmitted to the second another device in the second communication method before a connection with the second another device is established, the information regarding the condition includes information that associates a period from when the predetermined signal is transmitted to when a response, by the second another device, to the predetermined signal is received with communication to be enabled when the second another device relays communication between the communication device and a predetermined device.

11. A control method performed by a base station that performs communication wirelessly by using a first communication method, the control method comprising:

transmitting information regarding a condition for communication in a second communication method within a geographical range where communication with the base station is enabled, to a communication device present within the geographical range, the second communication method being different from the first communication method, wherein the information regarding the condition includes information that associates a period from transmission of a predetermined signal in the second communication method to reception by another device of a response to the predetermined signal, before the communication device establishes a connection with the another device, with communication to be enabled when the another device relays communication between the communication device and a predetermined device.

12. A non-transitory computer-readable storage medium that stores a program for causing a computer included in a communication device that performs communication wirelessly to:

receive by using a first communication method, from a first another device, information regarding a condition for communication in a second communication method within a geographical range where communication with the first another device is enabled, the second communication method being different from the first communication method; and select a second another device that performs the communication in the second communication method, based on the information regarding the condition, wherein, in a case where a predetermined signal is transmitted to the second another device in the second communication method before a connection with the second another device is established, the information regarding the condition includes information that associates a period from when the predetermined signal is transmitted to when a response, by the second another device, to the predetermined signal is received with communication to be enabled when the second another device relays communication between the communication device and a predetermined device.

13. A non-transitory computer-readable storage medium that stores a program for causing a computer included in a base station, comprising:

performing communication wirelessly by using a first communication method to transmit information regarding a condition for communication in a second communication method within a geographical range where communication with the base station is enabled, to a communication device present within the geographical range, the second communication method being different from the first communication method, wherein the information regarding the condition includes information that associates a period from transmission of a predetermined signal in the second communication method to reception by another device of a response to the predetermined signal, before the communication device establishes a connection with the another device, with communication to be enabled when the another device relays communication between the communication device and a predetermined device.

* * * * *